United States Patent
Okaichi et al.

(10) Patent No.: US 10,385,836 B2
(45) Date of Patent: Aug. 20, 2019

(54) RECIPROCATING COMPRESSOR AND HYDROGEN SUPPLY SYSTEM

(71) Applicant: Panasonic Intellectual Property Management Co., Ltd., Osaka (JP)

(72) Inventors: Atsuo Okaichi, Osaka (JP); Mio Furui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 15/181,560

(22) Filed: Jun. 14, 2016

(65) Prior Publication Data

US 2017/0016435 A1 Jan. 19, 2017

(30) Foreign Application Priority Data

Jul. 14, 2015 (JP) .................. 2015-140818

(51) Int. Cl.
*F04B 39/00* (2006.01)
*F04B 39/12* (2006.01)
(Continued)

(52) U.S. Cl.
CPC .......... *F04B 39/0005* (2013.01); *F04B 37/20* (2013.01); *F04B 39/0011* (2013.01);
(Continued)

(58) Field of Classification Search
CPC .. F04B 39/0005; F04B 39/125; F04B 39/122; F04B 39/062; F04B 39/12;
(Continued)

(56) References Cited

U.S. PATENT DOCUMENTS

| 400,668 A | * | 4/1889 | Hambay | ............. F04B 39/0011 |
| | | | | 417/99 |
| 609,088 A | * | 8/1898 | Dutton | .................. F04B 53/141 |
| | | | | 417/92 |

(Continued)

FOREIGN PATENT DOCUMENTS

| JP | 2000272901 A | * 10/2000 |
| JP | 2004-084523 | 3/2004 |
| JP | 2012-526940 | 11/2012 |
| JP | 2014-214695 | 11/2014 |

OTHER PUBLICATIONS

English Abstract of JP2000272901A dated Oct. 3, 2000.*
The Extended European Search Report dated Jun. 16, 2017 for the related European Patent Application No. 16175668.9.

*Primary Examiner* — Nathan C Zollinger
(74) *Attorney, Agent, or Firm* — McDermott Will & Emery LLP

(57) ABSTRACT

A reciprocating compressor of the disclosure includes a cylinder, a piston, a space for compressing gas, a discharge port for discharging the compressed gas from the space, a discharge valve, and a supplying port for supplying liquid that is different in kind from the gas. The cylinder has an axis extending in a direction of gravity. The piston is disposed to be reciprocable along the axis inside the cylinder. The space is constituted above the piston by being surrounded by the piston and an inner peripheral surface of the cylinder. The inner peripheral surface of the cylinder includes a straight portion and a throttle portion. The throttle portion is constituted such that an inner diameter of the cylinder decreases toward the discharge valve.

9 Claims, 5 Drawing Sheets

(51) Int. Cl.
*F04B 53/14* (2006.01)
*F04B 37/20* (2006.01)
*F04B 39/06* (2006.01)

(52) U.S. Cl.
CPC ............ *F04B 39/062* (2013.01); *F04B 39/12* (2013.01); *F04B 39/122* (2013.01); *F04B 39/125* (2013.01); *F04B 53/141* (2013.01); *Y02E 60/324* (2013.01)

(58) Field of Classification Search
CPC .................. F04B 39/0011; F04B 37/20; F04B 2015/0822; F04B 53/141; F04B 39/042; Y02E 60/324
USPC ........................................................... 417/92
See application file for complete search history.

(56) References Cited

U.S. PATENT DOCUMENTS

| | | | | |
|---|---|---|---|---|
| 967,013 | A * | 8/1910 | Gaucher | ............... F04B 53/141 417/439 |
| 1,436,443 | A * | 11/1922 | Holmes | .................. F25B 31/00 417/92 |
| 4,750,409 | A * | 6/1988 | Hendry | ............... F04B 39/0011 92/158 |
| 9,874,203 | B2 * | 1/2018 | Saadat | .................... F04B 35/01 |
| 2004/0060294 | A1 | 4/2004 | Yatsuzuka et al. | |
| 2010/0329903 | A1 | 12/2010 | Fong et al. | |
| 2012/0134851 | A1 * | 5/2012 | Adler | ........................ F04F 1/06 417/101 |
| 2014/0322043 | A1 | 10/2014 | Nagura et al. | |

\* cited by examiner

RECIPROCATING COMPRESSOR AND HYDROGEN SUPPLY SYSTEM

BACKGROUND

1. Technical Field

The present disclosure relates to a reciprocating compressor and a hydrogen supply system.

2. Description of the Related Art

Conventionally known machines for compressing gas include reciprocating compressors. For example, a reciprocating compressor including a cylinder, a piston, an intake valve, and a release valve is known.

As shown in FIG. 5A, Japanese Unexamined Patent Application Publication No. 2014-214695 discloses a reciprocating compressor 300. The reciprocating compressor 300 includes a cylinder 304, a piston 312, an intake valve 306a, a release valve 306b, a crank mechanism 308, a plurality of piston rings 314, oil packing 318, and rod packing 321. The reciprocating compressor 300 is used to compress hydrogen gas to an ultrahigh pressure. The piston ring 314 is made of an elastic material, and is fit on the piston 312. In a state in which the piston rings 314 are fit on the piston 312 and are inserted inside the cylinder 304, outer peripheral portions of the piston rings 314 are sliding contact with an inner peripheral surface of the cylinder 304. With this configuration, the piston rings 314 prevent gas compressed to an ultrahigh pressure by the piston 312 from leaking out from a compression chamber through a gap between the inner peripheral surface of the cylinder 304 and an outer peripheral surface of the piston 312. The piston 312 is inserted to extend through the rod packing 321 while the piston 312 is slidable in an axial direction of the piston 312. The rod packing 321 prevents gas from leaking out from the cylinder 304.

As shown in FIG. 5B, Japanese Unexamined Patent Application Publication (Translation of PCT Application) No. 2012-526940 discloses a compressor 500. The compressor 500 includes a cylinder 501, a hydraulic piston 504, a piston dummy 505, a suction valve 506, and a delivery valve 507. The compressor 500 is used for the purpose of, for example, compressing a gaseous medium, such as hydrogen and natural gas. A piston chamber 502 is constituted inside the cylinder 501, and a liquid 503 is arranged inside the piston chamber 502. The liquid 503 is preferably an ionic liquid. The piston dummy 505 is arranged in the liquid 503, and the liquid 503 circulates around the piston dummy 505. During a compression stroke, the liquid 503 is moved upward together with the piston dummy 505. The contour of the piston dummy 505 is matched to the shape of a head region of a space inside the cylinder 501. For this reason, when the piston dummy 505 approaches a top dead center, the piston dummy 505 and the piston chamber 502 form a ring gap 508, and acceleration of the liquid 503 is achieved in the ring gap 508. The acceleration of the liquid 503 allows the liquid 503 to be in contact with a cylinder head to be cooled for a long time. Additionally, since the liquid 503 is accelerated in the ring gap 508, a turbulent flow is produced in the liquid 503, and the turbulent flow brings about a cooling effect.

SUMMARY

The reciprocating compressor 300 disclosed in Japanese Unexamined Patent Application Publication No. 2014-214695 and the compressor 500 disclosed in Japanese Unexamined Patent Application Publication (Translation of PCT Application) No. 2012-526940 have room for improvement from the viewpoint of enhancing efficiency during operation. One non-limiting and exemplary embodiment provides a reciprocating compressor which has high efficiency during operation.

In one general aspect, the techniques disclosed here feature a reciprocating compressor including: a cylinder having an axis in a gravity direction; a piston disposed to be reciprocable along the axis inside the cylinder; the piston and the cylinder that constitute a space such that gas is compressed therein, and the space is present above the piston and surrounded by the piston and an inner peripheral surface of the cylinder; a discharge port that discharges the gas compressed in the space, the discharge port being disposed above the space; a discharge valve disposed above the discharge port, the discharge valve being open when the gas is discharged through the discharge port; and a supplying port disposed above the piston for supplying liquid that is different in kind from the gas to the space such that the liquid is held in a predetermined amount in the space during operation. The inner peripheral surface of the cylinder includes a straight portion and a throttle portion, the straight portion extending in parallel to the axis from a bottom dead center of the piston to a specific position disposed above a top dead center of the piston and below the discharge port, and the throttle portion constituted such that an inner diameter of the cylinder decreases from the specific position toward the discharge valve in the axis direction.

The reciprocating compressor can operate with high efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
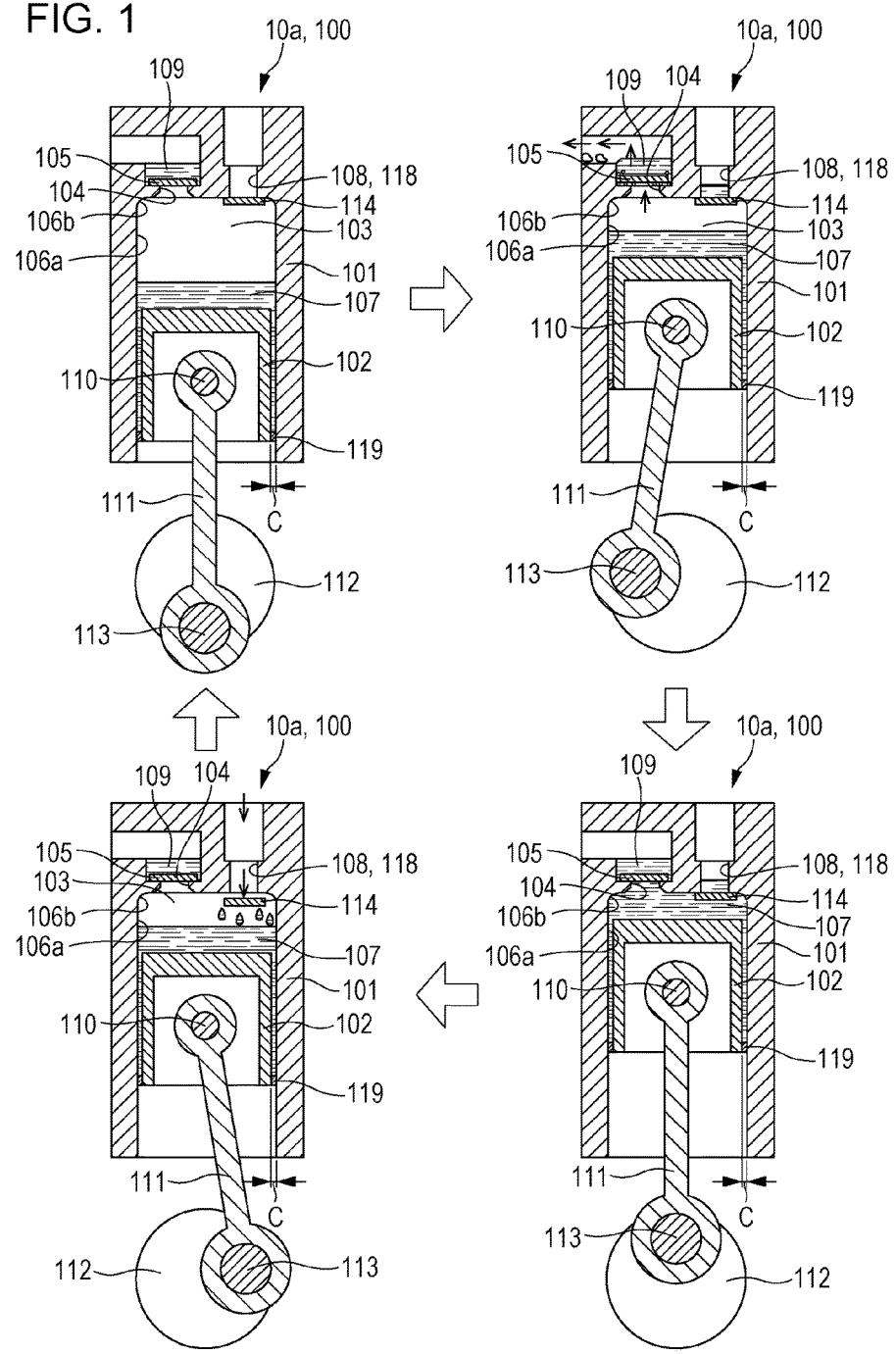
FIG. 1 is a cross-sectional view showing the operation of a reciprocating compressor according to an embodiment of the present disclosure.

Since the piston rings 314 and the rod packing 321 slide in contact with the inner peripheral surface of the cylinder 304 or the outer peripheral surface of the piston 312, a great friction loss occurs. The efficiency of the reciprocating compressor 300 during operation is thus low. Additionally, gas leakage may occur due to abrasion of the piston rings 314 and the rod packing 321, and the piston rings 314 and the rod packing 321 need periodic replacement. The maintenance cost of the reciprocating compressor 300 is thus high. In addition, gas remains in a space inside the cylinder 304 which extends from a top dead center of the piston 312 to the release valve 306b, and the gas expands during a suction stroke. For this reason, gas cannot be sufficiently sucked, and the expanded gas is recompressed, which creates work ineffective for surroundings. Hence, the efficiency of the reciprocating compressor 300 during operation is low.

When the piston dummy 505 is disposed at a top dead center, acceleration of the liquid 503 is achieved in the ring gap 508. However, gas may remain in part of the space inside the cylinder 501 which extends from the top dead center of the piston dummy 505 to the delivery valve 507. In particular, since the liquid 503 is accelerated in the ring gap 508 to create a turbulent flow in the liquid 503, gas is likely to remain in part of the space inside the cylinder 501 due to disturbance of the surface of the liquid 503. The remaining gas expands during a suction stroke to prevent sufficient suction of gas, and the expanded gas is recompressed, which creates work ineffective for surroundings. This results in a reduction in the efficiency of the compressor 500 during operation.

In a first aspect, the present disclosure provides a reciprocating compressor including a cylinder having an axis in a gravity direction;

a piston disposed to be reciprocable along the axis inside the cylinder;

the piston and the cylinder that constitute a space such that gas is compressed therein, and the space is present above the piston and surrounded by the piston and an inner peripheral surface of the cylinder;

a discharge port that discharges the gas compressed in the space, the discharge port being disposed above the space;

a discharge valve disposed above the discharge port, the discharge valve being open when the gas is discharged through the discharge port; and a supplying port disposed above the piston for supplying liquid that is different in kind from the gas to the space such that the liquid is held in a predetermined amount in the space during operation, wherein the inner peripheral surface of the cylinder includes a straight portion and a throttle portion, the straight portion extending in parallel to the axis from a bottom dead center of the piston to a specific position disposed above a top dead center of the piston and below the discharge port, and the throttle portion constituted such that an inner diameter of the cylinder decreases from the specific position toward the discharge valve in the axis direction.

According to the first aspect, the cylinder has the axis extending in the direction of gravity, and the liquid that is a substance different in type from the gas is held in the predetermined amount in the space for compressing the gas during operation of the reciprocating compressor. For this reason, the gas is present above the liquid held in the space. This configuration allows inhibition of gas leakage from a gap between the inner peripheral surface of the cylinder and the piston without provision of a large number of sealing members between the inner peripheral surface of the cylinder and the piston. As a result, the reciprocating compressor has high efficiency during operation. Additionally, the liquid that is a substance different in type from the gas is supplied to the space for compressing the gas through the supplying port during operation of the reciprocating compressor. It is thus possible to push the gas with the liquid and exhaust the gas from a space extending from the top dead center of the piston to the discharge valve such that little gas is left in the space, when the piston approaches the top dead center. Since work ineffective for surroundings that accompanies expansion and recompression of remaining gas can be reduced, the reciprocating compressor has high efficiency during operation. In addition, the inner peripheral surface of the cylinder includes the throttle portion constituted such that the inner diameter of the cylinder decreases from the specific position disposed above the top dead center of the piston and below the discharge port toward the discharge valve. For this reason, when the piston approaches the top dead center, the liquid is smoothly guided to the discharge valve by the throttle portion. This allows inhibition of a local abnormal rise in pressure due to a collision of the liquid. Moreover, the straight portion is constituted to extend from the bottom dead center of the piston to the specific position disposed above the top dead center of the piston and below the discharge port, and the throttle portion is disposed above the straight portion. Since a surface of the liquid decreases gradually before a state at the top dead center, the surface of the liquid is unlikely to be disturbed, and the gas can be inhibited from remaining. As a result, the reciprocating compressor has high efficiency during operation.

In a second aspect, the present disclosure provides a reciprocating compressor according to the first aspect, in which the throttle portion is constituted such that the inner diameter of the cylinder decreases continuously from the specific position to the discharge port in the axis direction. According to the second aspect, when the piston approaches the top dead center, the liquid is smoothly guided to the discharge valve with higher reliability by the throttle portion. This allows more reliable inhibition of a local abnormal rise in pressure due to a collision of the liquid.

In a third aspect, the present disclosure provides a reciprocating compressor according to the first or second aspect, in which the throttle portion is constituted such that the inner diameter of the cylinder decreases continuously from the specific position to an end portion closer to the discharge valve of the discharge port in the axis direction. According to the third aspect, when the piston approaches the top dead center, the liquid is smoothly guided to the discharge valve with higher reliability by the throttle portion. This allows more reliable inhibition of a local abnormal rise in pressure due to a collision of the liquid.

In a fourth aspect, the present disclosure provides a reciprocating compressor according to any one of the first to third aspects, further including an intake port disposed above the piston for supplying the gas to be compressed in the space to the space, and a suction valve disposed below the intake port, the suction valve being open when the gas is supplied to the space through the intake port, in which the suction valve is arranged between the top dead center of the piston and the discharge port in the axis direction According to the fourth aspect, it is possible to prevent the gas from remaining around the intake port in the space for compressing the gas.

In a fifth aspect, the present disclosure provides a reciprocating compressor according to the fourth aspect, in which the intake port doubles as the supplying port. According to the fifth aspect, the liquid is supplied to the space for compressing the gas through the intake port. It is thus possible to supply the liquid to the space with a minimum number of channels which may cause gas leakage from the space.

In a sixth aspect, the present disclosure provides a reciprocating compressor according to any one of the first to fifth aspects, further including a storage space extending upward from the discharge valve such that at least part of the liquid exhausted through the discharge port is stored. According to the sixth aspect, the at least part of the liquid is stored in the storage space, which allows prevention of backflow of the gas after passage through the discharge valve. This allows enhancement of performance of the reciprocating compressor.

In a seventh aspect, the present disclosure provides a reciprocating compressor according to any one of the first to sixth aspects, further including a sealing member arranged at a lower end portion of the piston, the sealing member sealing a gap between an outer peripheral surface of the piston and the inner peripheral surface of the cylinder, in which the reciprocating compressor has a continuous clearance constituted between the outer peripheral surface of the piston and the inner peripheral surface of the cylinder to extend from the sealing member to an upper end of the piston in the axis direction. According to the seventh aspect, the sealing member can inhibit leakage of the liquid from the gap between the outer peripheral surface of the piston and the inner peripheral surface of the cylinder. In particular, leakage of the liquid can be inhibited during non-operation of the reciprocating compressor. Additionally, the continuous clearance is constituted between the outer peripheral surface of the piston and the inner peripheral surface of the cylinder to extend from the sealing member to the upper end of the piston. This allows a reduction in friction loss between the outer peripheral surface of the piston and the inner peripheral surface of the cylinder. As a result, the reciprocating compressor has high efficiency during operation.

In an eighth aspect, the present disclosure provides a reciprocating compressor according to any one of the first to seventh aspects, in which the liquid has a vapor pressure not more than atmospheric pressure during operation of the reciprocating compressor. According to the eighth aspect, even if a pressure of the gas supplied to the space for compressing the gas is atmospheric pressure, the vapor pressure of the liquid does not exceed the pressure of the gas. This inhibits occurrence of rapid vaporization, such as boiling, in the liquid and allows a reduction in the useless work of compressing gas derived from vaporization of liquid. Thus, the reciprocating compressor has high efficiency during operation.

In a ninth aspect, the present disclosure provides a reciprocating compressor according to any one of the first to eighth aspects, further including one of a cooler which cools fluid to pass through the supplying port that includes vapor of a substance different in kind from the gas and condenses the vapor and a supplying channel for supplying the liquid such that the liquid is included in the fluid to pass through the supplying port. According to the ninth aspect, liquid derived from the condensation of the vapor in the cooler or the liquid supplied through the supplying channel can be supplied to the space for compressing the gas through the supplying port. Additionally, the amount of the liquid supplied to the space for compressing the gas through the supplying port can be adjusted by adjusting cooling capacity of the cooler or a flow rate of the liquid in the supplying channel.

In a tenth aspect, the present disclosure provides a hydrogen supply system including a reciprocating compressor according to any one of the first to ninth aspects which uses hydrogen as the gas and uses water as the liquid, a hydrogen production apparatus which reforms hydrocarbon gas and produces supply gas containing hydrogen to be supplied to the space of the reciprocating compressor, and one of a cooler which cools the supply gas and condensates at least part of vapor included in the supply gas and a water supply channel for supplying water such that liquid water is mixed in a flow of the supply gas flowing toward the space of the reciprocating compressor.

According to the tenth aspect, hydrogen can be compressed using water derived by condensation of vapor by the cooler or water supplied by the water supply channel as liquid used in the reciprocating compressor.

In an 11th aspect, the present disclosure provides a hydrogen supply system according to the tenth aspect, in which the reciprocating compressor includes one of the cooler and the water supply channel.

In a 12th aspect, the present disclosure provides a reciprocating compressor including a cylinder having an axis extending in a direction of gravity;

the piston and the cylinder configured to form a space such that gas is compressed therein, and the space is present above the piston and surrounded by the piston and an inner peripheral surface of the cylinder;

a discharge port that discharges the gas compressed in the space, the discharge port being disposed above the space;

a discharge valve disposed above the discharge port, the discharge valve being open when the gas is discharged through the discharge port; and a supplying port disposed above the piston for supplying liquid that is different in kind from the gas to the space such that the liquid is held in a predetermined amount in the space during operation; and a storage space extending upward from the discharge valve such that at least part of the liquid exhausted through the discharge port is stored.

An embodiment of the present disclosure will be described below with reference to the drawings. Note that the following description is merely illustrative of the present disclosure, and the present disclosure is not limited to this.

<Reciprocating Compressor>

As shown in FIG. 1, a reciprocating compressor 10a includes a cylinder 101, a piston 102, a space 103 for compressing gas, a discharge port 104, a discharge valve 105, and a supplying port 108. The cylinder 101 has an axis extending in a direction of gravity. The piston 102 is arranged to be reciprocable along the axis of the cylinder 101 inside the cylinder 101. The space 103 is constituted above the piston 102 by being surrounded by an inner peripheral surface of the cylinder 101 and the piston 102. The discharge port 104 is a port disposed above the space 103 for discharging gas compressed in the space 103 from the space 103. The discharge valve 105 is disposed above the discharge port 104 and is open when gas is discharged through the discharge port 104. The discharge valve 105 is, for example, a check valve. The discharge valve 105 is open when the pressure of the space 103 is not less than a predetermined pressure and is closed when the pressure of the space 103 is less than the predetermined pressure. This configuration inhibits gas discharged from the space 103 through the discharge port 104 from flowing backward to the space 103. The supplying port 108 is a port for supplying a liquid 107 that is a substance different in type from gas to be compressed in the space 103 such that the liquid 107 is held in a predetermined amount in the space 103 during operation of the reciprocating compressor 10a. The inner peripheral surface of the cylinder 101 includes a straight portion 106a and a throttle portion 106b. The straight portion 106a extends in parallel to the axis from a bottom dead center of the piston 102 to a specific position disposed above a top dead center of the piston 102 and below the discharge port 104 in a direction, in which the axis extends. The throttle portion 106b is constituted such that an inner diameter of the cylinder 101 decreases from the specific position disposed above the top dead center of the piston 102 and below the discharge port 104 toward the discharge valve 105 in the direction, in which the axis extends. In the above-described manner, a compression mechanism 100 of the reciprocating compressor 10a is configured. Note that the space 103 corresponds to a space extending from an upper end of the piston 102 to an end closer to the discharge valve 105 of the discharge port 104 of a space inside the cylinder 101, and the discharge port 104 forms part of the space 103.

The piston 102 includes, for example, a top wall extending horizontally from the axis of the cylinder 101 close to the inner peripheral surface of the cylinder 101 in the space inside the cylinder 101 and a side wall extending downward from a rim of the top wall in the direction, in which the axis of the cylinder 101 extends. The top wall of the piston 102 extends horizontally, for example, over the whole top wall.

The compression mechanism 100 of the reciprocating compressor 10a further includes, for example, a piston pin 110, a connecting rod 111, a shaft 112, and an eccentric shaft 113. For example, upon energization of a motor (not shown), a rotor of the motor rotates the shaft 112. The eccentric shaft 113 is attached to the shaft 112 at a position displaced from a center of rotation of the shaft 112 in a radial direction of the shaft 112. The piston pin 110 extends along a horizontal line passing through a central axis of the piston 102 in a space surrounded by the side wall of the piston 102, and two ends of the piston pin 110 are fixed to the side wall of the piston 102. The connecting rod 111 has a small hole, into which the piston pin 110 is to be inserted, at one end of the connecting rod 111 and a large hole, into which the eccentric shaft 113 is to be inserted, at the other end of the connecting rod 111. The piston pin 110 is inserted into the small hole of the connecting rod 111, and the eccentric shaft 113 is inserted into the large hole of the connecting rod 111, thereby attaching the connecting rod 111 to the piston pin 110 and the eccentric shaft 113. As described above, the piston pin 110 and the eccentric shaft 113 are coupled by the connecting rod 111.

When the shaft 112 rotates, the eccentric shaft 113 makes a turning motion (eccentric rotary motion) with respect to the center of rotation of the shaft 112. The turning motion of the eccentric shaft 113 is converted into a reciprocating motion by the connecting rod 111 and is transmitted to the piston pin 110. In this manner, the piston 102 makes a reciprocating motion along the axis of the cylinder 101 inside the cylinder 101.

The reciprocating compressor 10a further includes, for example, an intake port 118 and a suction valve 114. The intake port 118 is a port disposed above the piston 102 for supplying gas to be compressed in the space 103 to the space 103. The suction valve 114 is disposed below the intake port 118 and is open when gas is supplied to the space 103 through the intake port 118. The suction valve 114 is, for example, a check valve. The suction valve 114 is open when the pressure of the space 103 is less than a predetermined pressure and is closed when the pressure of the space 103 is not less than the predetermined pressure. This inhibits gas sucked into the space 103 through the intake port 118 from flowing backward. Note that the suction valve 114 is open only when the discharge valve 105 is closed. The suction valve 114 is arranged between the top dead center of the piston 102 and the discharge port 104 in the direction, in which the axis of the cylinder 101 extends. The intake port 118 may double as the supplying port 108, as shown in FIG. 1, or the supplying port 108 and the intake port 118 may be separately constituted.

As described above, with energization of the motor (not shown), the piston 102 makes a reciprocating motion, as shown in FIG. 1. With the reciprocating motion of the piston 102, gas is sucked into the space 103 through the intake port 118, compressed in the space 103, and then discharged to outside the space 103 through the discharge port 104. Through repetition of the operation, the reciprocating compressor 10a sucks, compresses, and discharges gas after gas to raise a gas pressure.

A state of the reciprocating compressor 10a when the piston 102 is disposed at the bottom dead center is shown at the upper left of FIG. 1. The liquid 107 having a density higher than that of gas to be compressed is held in contact with the piston 102 in a lower portion of the space 103. Of the space 103, a space above the liquid 107 is filled with the gas to be compressed. When a reciprocating motion of the piston 102 progresses, the piston 102 moves upward, as illustrated at the upper right of FIG. 1. This reduces the volume of a space filled with the gas of the space 103 to compress the gas. When the pressure of the gas is not less than the predetermined pressure, the discharge valve 105 is pushed upward and opened, and the gas is discharged to outside the space 103 through the discharge port 104. In this case, the surface of the liquid 107 held in the space 103 rise gradually, and the gas is exhausted from the space 103 such that little gas is left in the space 103. Part of the liquid 107 is also discharged from the space 103 through the discharge port 104. When the reciprocating motion of the piston 102 progresses further, the piston 102 arrives at the top dead center, as illustrated at the lower right of FIG. 1. At this time, the discharge valve 105 is closed, and the space 103 is filled with the liquid 107 alone.

When the reciprocating motion of the piston 102 progresses further, the piston 102 moves downward, as illustrated at the lower left of FIG. 1. Since the liquid 107 alone is present in the space 103 when the piston 102 is disposed at the top dead center, the pressure in the space 103 drops rapidly when the piston 102 moves downward from the top dead center of the piston 102. When the pressure in the space 103 is not more than the predetermined pressure, the suction valve 114 is pushed downward and opened, and gas is sucked into the space 103 through the intake port 118. At this time, the liquid 107 is supplied to the space 103 through the supplying port 108. With this supply, the liquid 107 is replenished in an amount corresponding to the amount of the liquid 107 that is discharged through the discharge port 104 before the arrival of the piston 102 at the top dead center. When the reciprocating motion of the piston 102 progresses further, the piston 102 arrives at the bottom dead center, as illustrated at the upper left of FIG. 1. This ends the gas suction into the space 103, and the suction valve 114 is closed. The reciprocating compressor 10a repeats the above-described operations.

Since the liquid 107 is held in the space 103, gas is prevented from leaking out through a gap between the piston 102 and the cylinder 101, and the reciprocating compressor 10a operates with high efficiency. For example, assume a case where the reciprocating compressor 10a uses hydrogen gas as gas and uses water as the liquid 107. In this case, the volume of water that leaks out through a gap between the piston 102 and the cylinder 101 is about one-hundredth of the volume of hydrogen gas that leaks out through the gap between the piston 102 and the cylinder 101 in a case where water as the liquid 107 is not held in the space 103. This is because the volume flow rate of fluid flowing through the gap between the piston 102 and the cylinder 101 is inversely proportional to the viscosity of the fluid, and the viscosity of water is about 100 times that of hydrogen gas. For this reason, of work of compression in the reciprocating compressor 10a, ineffective work due to gas leakage is reduced, and the reciprocating compressor 10a operates with high efficiency. Additionally, since the liquid 107 removes gas from the space 103 such that little gas is left in the space 103 when the piston 102 approaches the top dead center, loss due to expansion and recompression of gas remaining in the space 103 is reduced. This enhances the efficiency of the reciprocating compressor 10a during operation. As described above, the inner peripheral surface of the cylinder 101 includes the throttle portion 106b that is constituted such that the inner diameter of the cylinder 101 decreases from the specific position disposed above the top dead center of the piston 102 and below the discharge port 104 toward the discharge valve 105. With this configuration, the liquid 107 after the removal of gas at the approach of the piston 102 to the top dead center is smoothly guided to the discharge valve 105 through the throttle portion 106b and is discharged. It is thus possible to inhibit a local abnormal rise in pressure due to a collision of the liquid 107. A part from the bottom dead center of the piston 102 to the specific position disposed above the top dead center of the piston 102 and below the discharge port 104 of the inner peripheral surface of the cylinder 101 is constituted as the straight portion 106a. The throttle portion 106b is disposed above the top dead center of the piston 102. For this reason, the surface of the liquid 107 is unlikely to be disturbed. This inhibits gas from remaining in the space 103 when the piston 102 is disposed at the top dead center. As a result, the reciprocating compressor 10a has high efficiency during operation.

As described above, the top wall of the piston 102 extends horizontally, for example, over the whole top wall of the piston 102. The straight portion 106a extends to a position above the top dead center of the piston 102. This configuration makes the velocity of the liquid 107 when the piston 102 rises unlikely to vary spatially. For this reason, the surface of the liquid 107 is unlikely to be disturbed when the piston 102 is rising, and gas is unlikely to remain when the piston 102 arrives at the top dead center. As a result, the reciprocating compressor 10a has high efficiency during operation.

The amount of the liquid 107 supplied to the space 103 through the supplying port 108 during a period when the piston 102 moves from the top dead center to the bottom dead center is set, for example, such that the amount of liquid 107 held in the space 103 exceeds a predetermined threshold when the piston 102 is disposed at the bottom dead center. The predetermined threshold is an amount of the liquid 107 corresponding to the volume of the space 103 when the piston 102 is disposed at the top dead center. In other words, the amount of the liquid 107 supplied to the space 103 through the supplying port 108 during a period when the piston 102 moves from the top dead center to the bottom dead center is set, for example, such that part of the liquid 107 is discharged through the discharge port 104 when the piston 102 arrives at the top dead center. With this configuration, little gas is left in the space 103 when the piston 102 arrives at the top dead center. As a result, work ineffective for surroundings that accompanies expansion and recompression of remaining gas can be reduced.

As described above, the suction valve 114 is arranged, for example, between the top dead center of the piston 102 and the discharge port 104 in the direction, in which the axis of the cylinder 101 extends. This configuration prevents gas from remaining around the intake port 118 in the space 103 when the piston 102 arrives at the top dead center. If the intake port 118 doubles as the supplying port 108, the liquid 107 can be supplied to the space 103 with a minimum number of channels which may cause gas leakage from the space 103.

As shown in FIG. 1, the reciprocating compressor 10a further includes, for example, a storage space 109. As described above, when the piston 102 approaches the top dead center, part of the liquid 107 is exhausted through the discharge port 104. The storage space 109 extends upward from the discharge valve 105 such that at least part of liquid 107 exhausted through the discharge port 104 is stored. The liquid 107 stored in the storage space 109 can prevent gas after passage through the discharge valve 105 from flowing back toward the space 103. The size of the storage space 109 is not particularly limited. The size is set from the viewpoint of reliably preventing backflow of gas, for example, such that the liquid 107 forms a liquid column 0.5 cm or more high above the discharge valve 105.

As shown in FIG. 1, the reciprocating compressor 10a further includes, for example, a sealing member 119. The sealing member 119 is arranged at a lower end portion of the piston 102 to seal a gap between an outer peripheral surface of the piston 102 and the inner peripheral surface of the cylinder 101. The reciprocating compressor 10a has a continuous clearance C constituted between the outer peripheral surface of the piston 102 and the inner peripheral surface of the cylinder 101 so as to extend from the sealing member 119 to the upper end of the piston 102 in the direction, in which the axis of the cylinder 101 extends. In other words, no member other than the sealing member 119 is arranged between the inner peripheral surface of the cylinder 101 and the outer peripheral surface of the piston 102 from the sealing member 119 to the upper end of the piston 102 in the direction, in which the axis of the cylinder 101 extends. Since the area of contact of a member in contact with the inner peripheral surface of the cylinder 101 is small, a friction loss can be reduced. Additionally, the clearance C is filled with the liquid 107 during operation of the reciprocating compressor 10a. The sealing member 119 inhibits the liquid 107 present in the clearance C from leaking out. The liquid 107 can be prevented from leaking out from the clearance C especially during non-operation of the reciprocating compressor 10a. Note that the sealing member 119 may be omitted in some cases.

The sealing member 119 is, for example, an annular ring which has an outer diameter larger than the inner diameter of the cylinder 101 at the straight portion 106a and is made of an elastic material, such as resin or metal, so as to leave a closed gap. In this case, when the sealing member 119 is attached, the inner peripheral surface of the cylinder 101 is in contact with an outer peripheral surface of the sealing member 119. At this time, the sealing member 119 is pushed against the outer peripheral surface of the piston 102 by the inner peripheral surface of the cylinder 101, and the closed gap of the sealing member 119 is smaller than before the attachment. With elasticity of the sealing member 119, the sealing member 119 is in close contact with the inner peripheral surface of the cylinder 101. Even if the sealing member 119 becomes slightly worn due to friction against the inner peripheral surface of the cylinder 101, the sealing member 119 spreads outward in a radial direction of the sealing member 119 with the elasticity of the sealing member 119 to come into close contact with the inner peripheral surface of the cylinder 101. For this reason, the sealing member 119 has a relatively long component life.

The liquid 107 to be held in the space 103 is, for example, a liquid which has a vapor pressure not more than atmospheric pressure during operation of the reciprocating compressor 10a. In this case, even if the pressure of gas supplied to the space 103 is atmospheric pressure, the vapor pressure of the liquid 107 does not exceed the pressure of the gas. This inhibits occurrence of rapid vaporization, such as boiling, in the liquid 107. For this reason, the useless work of compressing gas derived from vaporization of liquid can be reduced. As a result, the reciprocating compressor 10a has high efficiency during operation. Gas to be compressed by the reciprocating compressor 10a is not particularly limited and is, for example, hydrogen gas. In this case, the liquid 107 is, for example, water.

Figure 2:
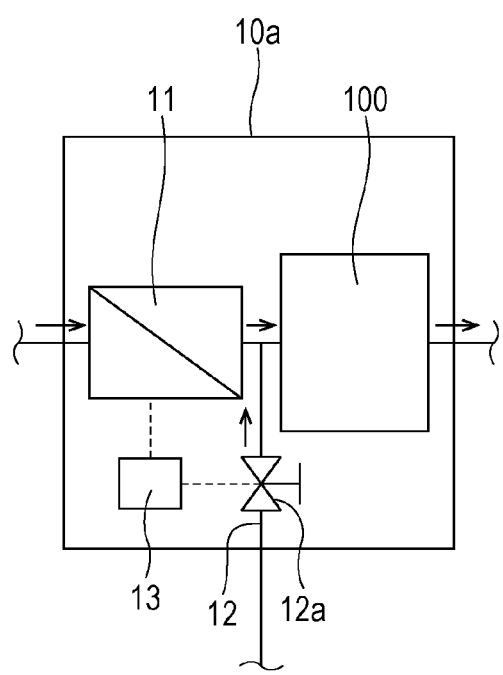
FIG. 2 is a configuration diagram showing the reciprocating compressor according to the embodiment of the present disclosure.

The reciprocating compressor 10a may further include, for example, a cooler 11 or a supplying channel 12, as shown in FIG. 2, in addition to the compression mechanism 100 with the above-described configuration. Either one of the cooler 11 and the supplying channel 12 may be omitted. The cooler 11 cools fluid to pass through the supplying port 108 which includes vapor of a substance different in type from gas to condense the vapor. Liquid derived from the condensation of the vapor in the cooler 11 is supplied to the space 103 through the supplying port 108. The cooler 11 may be a liquid-cooled heat exchanger, such as a shell-and-tube heat exchanger, a plate type heat exchanger, or a double-pipe heat exchanger, or an air-cooled heat exchanger, such as a fin tube heat exchanger. As shown in FIG. 2, the reciprocating compressor 10a further includes, for example, a controller 13. The controller 13 includes, for example, an arithmetic device, such as a microprocessor, a storage device, such as a ROM, having a predetermined program stored therein, and a storage device, such as a RAM, temporarily storing a calculation result from the arithmetic device. The controller 13 adjusts the cooling capacity of the cooler 11 for condensing vapor included in fluid flowing toward the supplying port 108 such that the liquid 107 is supplied in a desired amount to the space 103 through the supplying port 108. The cooling capacity of the cooler 11 can be changed by, for example, changing the flow rate of liquid or gas for cooling fluid flowing toward the supplying port 108.

The supplying channel 12 is a channel for supplying the liquid 107 such that the liquid 107 is included in fluid to pass through the supplying port 108. As shown in FIG. 2, the supplying channel 12 is linked to a channel for the fluid to pass through the supplying port 108 upstream of the supplying port 108 in a flow direction of the fluid. For example, the supplying channel 12 is linked to the channel for the fluid to pass through the supplying port 108 downstream of an exit from the cooler 11 in the flow direction of the fluid. For example, a flow control valve 12a is arranged midway in the supplying channel 12. The flow control valve 12a is, for example, a solenoid valve or a motor-operated valve. The controller 13 adjusts the flow rate of the liquid 107 that flows through the supplying channel 12 such that the liquid 107 is supplied in the desired amount to the space 103 through the supplying port 108. The controller 13 adjusts the flow rate of the liquid 107 flowing through the supplying channel 12 by, for example, changing the open/closed state or the opening degree of the flow control valve 12a.

(Modification)

The reciprocating compressor 10a can be changed from various viewpoints. For example, the reciprocating compressor 10a may be changed to be a reciprocating compressor 10b shown in FIG. 3. Unless otherwise specified, the reciprocating compressor 10b is configured in the same manner as in the reciprocating compressor 10a. Constituent elements of the reciprocating compressor 10b, identical or corresponding to the constituent elements of the reciprocating compressor 10a, are denoted by identical reference characters, and a detailed description thereof may be omitted. A description of the reciprocating compressor 10a also applies to the reciprocating compressor 10b unless there is technical inconsistency.

Figure 3:
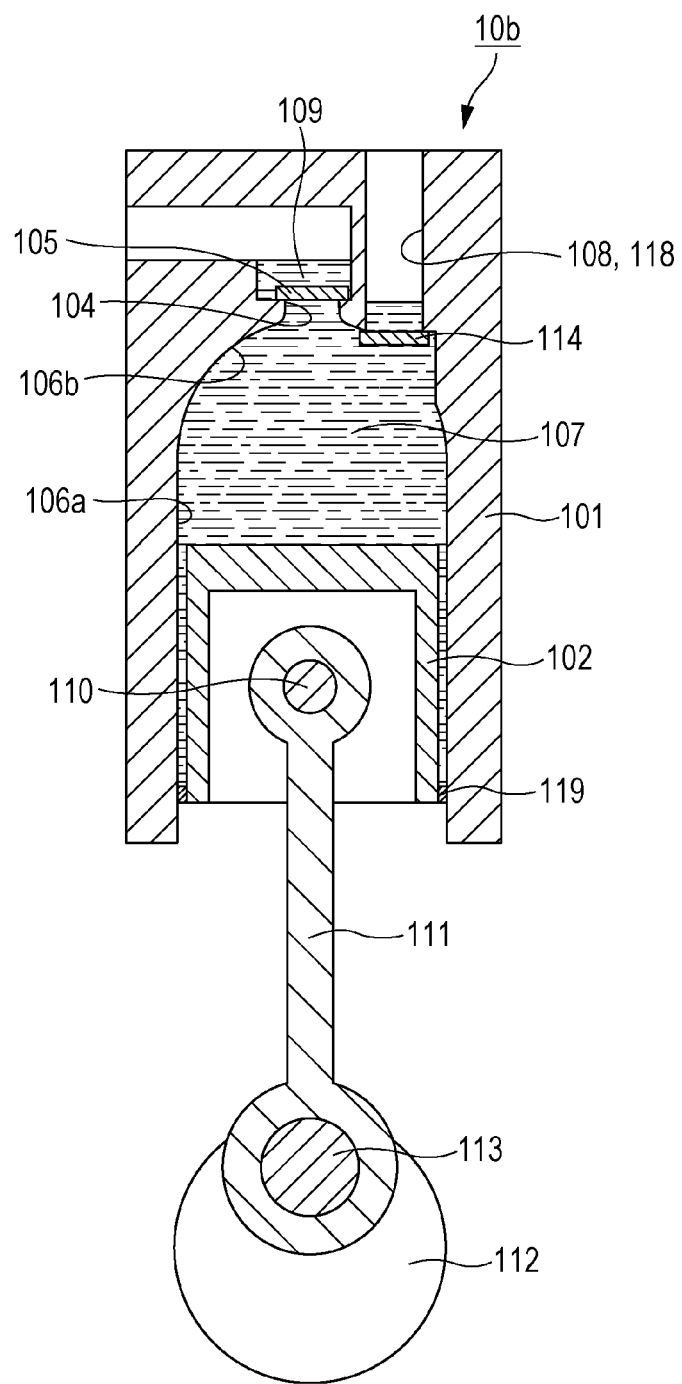
FIG. 3 is a cross-sectional view showing a reciprocating compressor according to a modification.

A state of the reciprocating compressor 10b when the piston 102 is disposed at a top dead center is shown in FIG. 3. As shown in FIG. 3, the discharge port 104 is provided on an axis of the cylinder 101. In other words, the discharge port 104 is provided near a center of an inner diameter of the cylinder 101. The throttle portion 106b is constituted such that the inner diameter of the cylinder 101 decreases continuously from a specific position disposed above the top dead center of the piston 102 and below the discharge port 104 to the discharge port 104 in a direction, in which the axis of the cylinder 101 extends. With this configuration, when the piston 102 approaches the top dead center, the liquid 107 after removal of gas from the space 103 is smoothly guided to the discharge port 104. This allows inhibition of a local abnormal rise in pressure due to a collision of the liquid 107.

The throttle portion 106b is constituted, for example, such that the inner diameter of the cylinder 101 decreases continuously from the specific position disposed above the top dead center of the piston 102 and below the discharge port 104 to an end portion closer to the discharge valve 105 of the discharge port 104 in the direction, in which the axis of the cylinder 101 extends. With this configuration, when the piston 102 approaches the top dead center, the liquid 107 after removal of gas from the space 103 is smoothly guided to the discharge valve 105. This allows inhibition of a local abnormal rise in pressure due to a collision of the liquid 107.

<Hydrogen Supply System>

A hydrogen supply system 1a and a hydrogen supply system 1b, each including the reciprocating compressor 10a, will be described. Note that the hydrogen supply system 1a and the hydrogen supply system 1b may each include the reciprocating compressor 10b instead of the reciprocating compressor 10a.

Figure 4A:
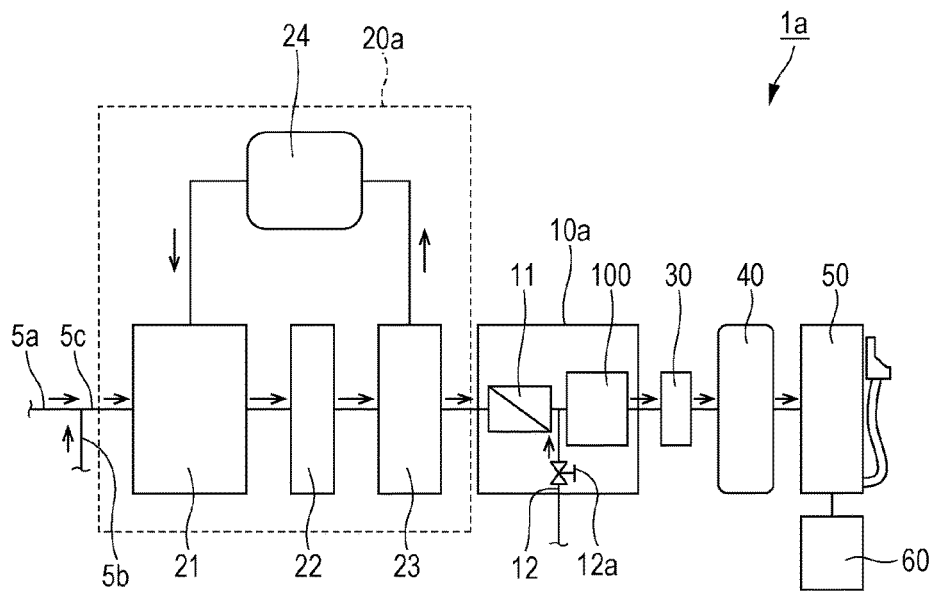
FIG. 4A is a configuration diagram of a hydrogen supply system including the reciprocating compressor shown in FIG. 1.

As shown in FIG. 4A, the hydrogen supply system 1a includes the reciprocating compressor 10a, a hydrogen production apparatus 20a, the cooler 11, and the water supply channel 12. The reciprocating compressor 10a uses hydrogen gas as gas to be compressed in the space 103 and uses water as the liquid 107. The hydrogen production apparatus 20a reforms hydrocarbon gas and produces supply gas that contains hydrogen to be supplied to the space 103 of the reciprocating compressor 10a. The cooler 11 cools the supply gas produced in the hydrogen production apparatus 20a and condenses at least part of vapor included in the supply gas. The water supply channel 12 is a channel for supplying water such that liquid water mixes with a flow of the supply gas flowing toward the space 103 of the reciprocating compressor 10a. Either one of the cooler 11 and the water supply channel 12 may be omitted. For example, although the reciprocating compressor 10a includes the cooler 11 or the water supply channel 12, the cooler 11 or the water supply channel 12 may be arranged separately from the reciprocating compressor 10a in the hydrogen supply system 1a.

As shown in FIG. 4A, the hydrogen production apparatus 20a includes a reformer 21, a shift converter 22, a pressure swing adsorption (PSA) device 23, and a buffer tank 24. The reformer 21, the shift converter 22, and the PSA device 23 are connected in that order by piping, and the buffer tank 24 is connected to the PSA device 23 and the reformer 21 by piping. As shown in FIG. 4A, the hydrogen supply system 1a further includes, for example, a source gas supply channel 5a, a vapor supply channel 5b, and a mixed gas supply channel 5c. One end of the mixed gas supply channel 5c is linked to the reformer 21, and the other end of the mixed gas supply channel 5c is linked to the source gas supply channel 5a and the vapor supply channel 5b. Hydrocarbon gas is supplied to the reformer 21 through the source gas supply channel 5a and the mixed gas supply channel 5c. Vapor is supplied to the reformer 21 through the vapor supply channel 5b and the mixed gas supply channel 5c.

In the reformer 21, the hydrocarbon gas and the vapor react together to mainly produce hydrogen gas and carbon monoxide (CO) gas. Gas after passage through the reformer 21 is supplied to the shift converter 22. In the shift converter 22, the carbon monoxide gas and vapor react together to mainly produce carbon dioxide gas and hydrogen gas. Gas after passage through the shift converter 22 is supplied to the PSA device 23. In the PSA device 23, gasses other than the hydrogen gas are separated from the gas supplied to the PSA device 23, and supply gas composed mainly of the hydrogen gas is exhausted from the hydrogen production apparatus 20a. The PSA device 23 is operated such that the supply gas exhausted from the hydrogen production apparatus 20a includes vapor in a predetermined amount. Of the gas supplied to the PSA device 23, the gases other than the supply gas are supplied to the buffer tank 24. In the buffer tank 24, recovered gas including hydrocarbon gas, vapor, carbon monoxide gas, and carbon dioxide gas is stored. To make efficient use of the hydrocarbon gas stored in the buffer tank 24, the recovered gas stored in the buffer tank 24 is supplied to the reformer 21.

The hydrogen production apparatus 20a is connected to the reciprocating compressor 10a by piping. The supply gas exhausted from the hydrogen production apparatus 20a is supplied to the cooler 11. The cooler 11 cools the supply gas and condenses at least part of vapor included in the supply gas. The water supply channel 12 supplies water such that the water mixes with a flow of the supply gas. The cooler 11 is linked to the compression mechanism 100 by piping. The water supply channel 12 is linked to a supply gas channel, for example, downstream of an exit from the cooler 11 in a flow direction of the supply gas. Fluid after passage through the cooler 11 is supplied to the compression mechanism 100. At this time, water is supplied to the space 103 through the supplying port 108. In the compression mechanism 100, hydrogen gas is compressed, and the hydrogen gas is exhausted from the reciprocating compressor 10a.

As shown in FIG. 4A, the hydrogen supply system 1a further includes, for example, a dewaterer 30, a hydrogen storage tank 40, a dispenser 50, and a precooler 60. In the dewaterer 30, water mixed in hydrogen gas exhausted from the reciprocating compressor 10a is removed. The hydrogen gas after passage through the dewaterer 30 is stored in the hydrogen storage tank 40. The hydrogen gas stored in the hydrogen storage tank 40 is supplied to a fuel cell electric vehicle or the like by the dispenser 50. At this time, the hydrogen gas is supplied from the dispenser 50 to outside the hydrogen supply system 1a while being cooled by the precooler 60.

Figure 4B:
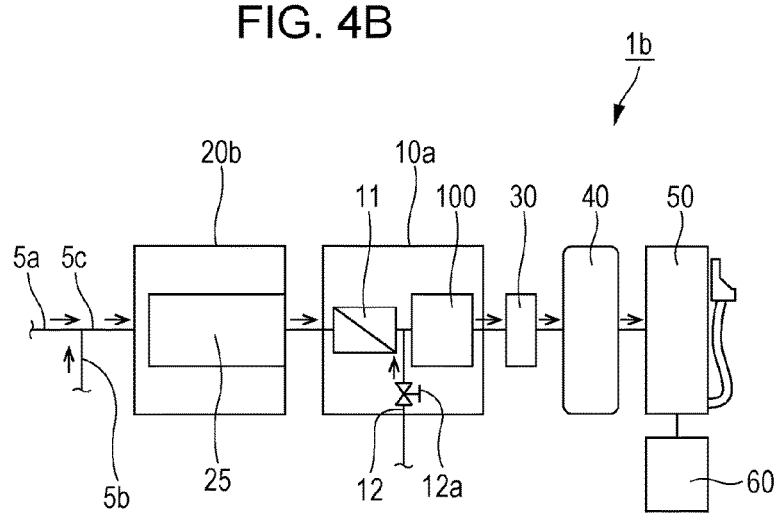
FIG. 4B is a configuration diagram of a different hydrogen supply system including the reciprocating compressor shown in FIG. 1.
Figure 5A:
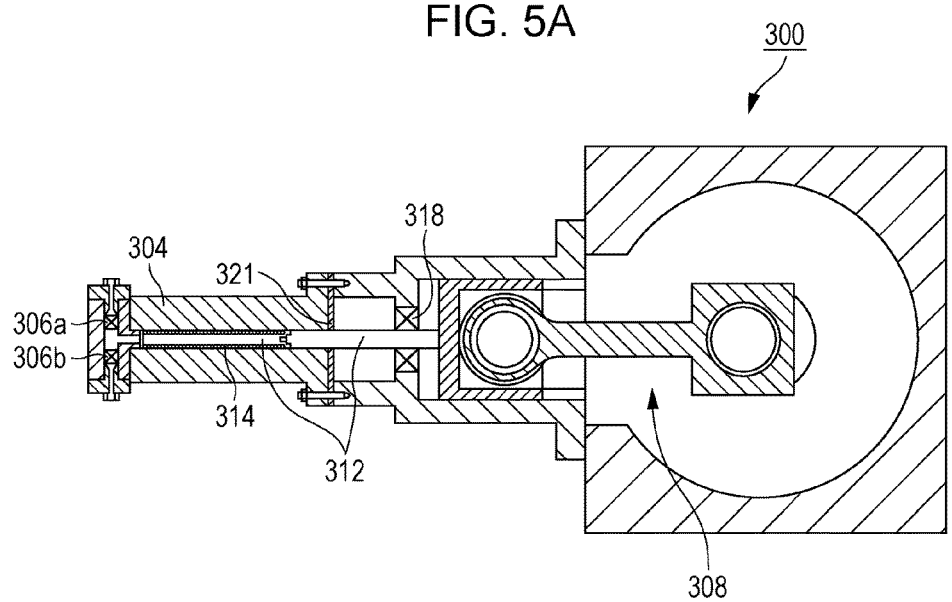
FIG. 5A is a cross-sectional view showing a conventional reciprocating compressor.
Figure 5B:
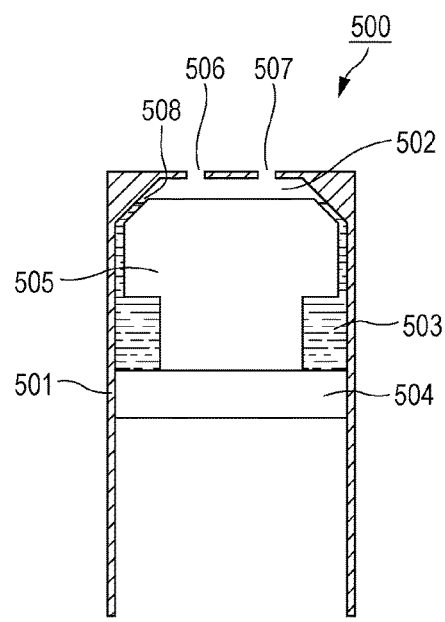
FIG. 5B is a cross-sectional view showing a different conventional compressor.

As shown in FIG. 4B, the hydrogen supply system 1b is the same as the hydrogen supply system 1a except that the hydrogen supply system 1b includes a hydrogen production apparatus 20b instead of the hydrogen production apparatus 20a. Hydrocarbon gas is supplied to the hydrogen production apparatus 20b through the source gas supply channel 5a and the mixed gas supply channel 5c, and vapor is supplied through the vapor supply channel 5b and the mixed gas supply channel 5c. With this supply, the hydrocarbon gas and the vapor react together in the hydrogen production apparatus 20b to produce hydrogen gas. A hydrogen permeable film module 25 is arranged inside the hydrogen production apparatus 20b. The hydrogen gas produced in the hydrogen production apparatus 20b passes through a hydrogen permeable film of the hydrogen permeable film module 25 and is exhausted as a main component of supply gas from the hydrogen production apparatus 20b. A predetermined amount of vapor is mixed in the supply gas exhausted from the hydrogen production apparatus 20b. The supply gas exhausted from the hydrogen production apparatus 20b is supplied to the cooler 11.

What is claimed is:

1. A reciprocating compressor comprising:
   a cylinder having an axis in a gravity direction that is an axis direction of the cylinder;
   a piston disposed to be reciprocable along the axis inside the cylinder;
   the piston and the cylinder constitute a space such that gas is compressed therein, and the space is present above the piston and surrounded by the piston and an inner peripheral surface of the cylinder;
   a discharge port that discharges the gas compressed in the space, the discharge port being disposed above the space;
   a discharge valve disposed above the discharge port, the discharge valve being open when the gas is discharged through the discharge port; and
   a supplying port disposed above the piston for supplying liquid that is different in kind from the gas to the space such that the liquid is held in a predetermined amount in the space during operation,
   wherein the inner peripheral surface of the cylinder includes a straight portion and a throttle portion, the straight portion extending in parallel to the axis direction from a bottom dead center of the piston to a specific position disposed above a top dead center of the piston and below the discharge port, and the throttle portion constituted such that an inner diameter of the cylinder decreases from the specific position toward the discharge valve in the axis direction,
   wherein the discharge port is disposed inside the inner diameter of the cylinder when viewed from the axis direction,
   wherein the reciprocating compressor further comprises:
      an intake port disposed above the piston for supplying the gas to be compressed in the space to the space; and
      a suction valve disposed below the intake port, the suction valve being open when the gas is supplied to the space through the intake port,
   wherein the suction valve is disposed between the top dead center of the piston and the discharge port in the axis direction, and
   wherein the intake port serves the supplying port.

2. The reciprocating compressor according to claim 1, wherein
   the throttle portion is constituted such that the inner diameter of the cylinder decreases continuously from the specific position to the discharge port in the axis direction and
   the discharge port is disposed on the axis of the cylinder.

3. The reciprocating compressor according to claim 1, wherein the throttle portion is constituted such that the inner diameter of the cylinder decreases continuously from the specific position to an end portion of the discharge valve of the discharge port in the axis direction.

4. The reciprocating compressor according to claim 1, further comprising:
   a storage space extending upward from the discharge valve such that at least part of the liquid exhausted through the discharge port is stored.

5. The reciprocating compressor according to claim 1, further comprising:
   a sealing member disposed at a lower end portion of the piston, the sealing member sealing a gap between an outer peripheral surface of the piston and the inner peripheral surface of the cylinder, wherein
   the reciprocating compressor has a continuous clearance constituted between the outer peripheral surface of the piston and the inner peripheral surface of the cylinder to extend from the sealing member to an upper end of the piston in the axis direction.

6. The reciprocating compressor according to claim 1, wherein the liquid has a vapor pressure not more than atmospheric pressure during operation of the reciprocating compressor.

7. The reciprocating compressor according to claim 1, further comprising:
   one of a cooler which cools fluid to pass through the supplying port that includes vapor different in kind from the gas and condenses the vapor and a supplying channel for supplying the liquid through the supplying port.

8. A hydrogen supply system comprising:
   reciprocating compressor comprising:
      a cylinder having an axis in a gravity direction that is an axis direction of the cylinder;
      a piston disposed to be reciprocable along the axis inside the cylinder;
      the piston and the cylinder constitute a space such that gas is compressed therein, and the space is present above the piston and surrounded by the piston and an inner peripheral surface of the cylinder;
      a discharge port that discharges the gas compressed in the space, the discharge port being disposed above the space;
      a discharge valve disposed above the discharge port, the discharge valve being open when the gas is discharged through the discharge port; and
      a supplying port disposed above the piston for supplying liquid that is different in kind from the gas to the space such that the liquid is held in a predetermined amount in the space during operation,
      wherein the inner peripheral surface of the cylinder includes a straight portion and a throttle portion, the straight portion extending in parallel to the axis direction from a bottom dead center of the piston to a specific position disposed above a top dead center of the piston and below the discharge port, and the throttle portion constituted such that an inner diameter of the cylinder decreases from the specific position toward the discharge valve in the axis direction, and
      wherein the discharge port is disposed inside the inner diameter of the cylinder when viewed from the axis direction,
      wherein the reciprocating compressor uses hydrogen as the gas and uses water as the liquid;
   a hydrogen production apparatus which reforms hydrocarbon gas and produces supply gas containing hydrogen to be supplied to the space of the reciprocating compressor; and
   one of a cooler which cools the supply gas and condenses vapor included in the supply gas and a water supply channel for supplying water such that liquid water is mixed in a flow of the supply gas flowing toward the space of the reciprocating compressor.

9. The hydrogen supply system according to claim 8, wherein the reciprocating compressor includes one of the cooler and the water supply channel.

\* \* \* \* \*